United States Patent [19]

Leclerc et al.

[11] 4,320,475

[45] Mar. 16, 1982

[54] MONOMODAL OPTICAL FIBRE HYDROPHONE OPERATING BY THE ELASTOOPTICAL EFFECT

[75] Inventors: Pierre Leclerc; Jean-Pierre Huignard; Michel Papuchon; Claude Puech, all of Paris, France

[73] Assignee: Thomson-CSF, Paris, France

[21] Appl. No.: 163,190

[22] Filed: Jun. 26, 1980

[30] Foreign Application Priority Data

Jun. 29, 1979 [FR] France ................. 79 16899

[51] Int. Cl.³ ........................................... H04R 29/00
[52] U.S. Cl. ................................. 367/149; 350/96.14
[58] Field of Search ........................... 367/149, 140; 350/96.13, 96.14

[56] References Cited

U.S. PATENT DOCUMENTS 4,193,130  3/1980  Young et al. .................. 367/149

OTHER PUBLICATIONS

Journal of the Acoustical Society of America, vol. 64, No. 5, Nov. 1978, New York, (US) - P. Shajenko et al., "On Fiber-Optic Hydrophone Sensitivity", pp. 1286–1288 — *p. 1286, left col., line 15 to right col., line 18, FIG. 1.

Optics and Laser Technology, vol. 7, No. 4, Aug. 1975 – Haywards Heath (GB) - G. Joynes et al., "Movement Measurement by Modulated Lasers Using Frequency Lock Loops", pp. 169–174, — *p. 170, left col. line 38 through p. 171, left col., line 14, FIG. 1.

Primary Examiner—Theodore M. Blum
Attorney, Agent, or Firm—Oblon, Fisher, Spivak, McClelland & Maier

[57] ABSTRACT

The hydrophone has an interferometer structure incorporating a measuring arm in which is provided a very long monomodal optical fibre immersed in the interaction medium in which is propagated the acoustic wave. A phase displacement is induced on the optical wave by the elastooptical effect and said wave is propagated in the fibre by the acoustic wave which creates an acoustic pressure field in the medium. A reference arm establishes a reference optical path and the phase displacement linked with the acoustic wave is detected by interferometry between the two optical waves emerging from the two arms. The optical connections between the source, the optical fibre immersed in the interaction medium, the reference arm and the detector being provided in guided optics in a compact structure.

5 Claims, 2 Drawing Figures

MONOMODAL OPTICAL FIBRE HYDROPHONE OPERATING BY THE ELASTOOPTICAL EFFECT

BACKGROUND OF THE INVENTION

The invention relates to the field of acoustic detection in a marine medium and more particularly relates to a monomodal optical fibre hydrophone operating by elastooptical effect, using the effects of interaction between the acoustic wave to be detected and a monomodal optical fibre on which said acoustic wave acts.

BRIEF SUMMARY OF THE INVENTION

The invention relates to a hydrophone incorporating more particularly a monomodal optical fibre immersed in water in which the acoustic wave is propagated. The propagation of this acoustic wave produces pressure variations in the propagation medium which, by the elastooptical effect, produce variations in the geometrical and optical parameters of the fibre. An optical wave propagating in the optical fibre undergoes phase variation which can be detected by interferometry by means of a second monomodal optical fibre forming a reference arm. The optical connections between the water-immersed optical fibre constituting the measuring arm and the reference optical fibre are established in an optically rigid and compact structure and are produced by integrated optical methods so as to prevent any misadjustment of the device in operation.

Thus, the present invention relates to a monomodal optical fibre hydrophone operating by the elastooptical effect, wherein it comprises a monomodal laser source coupled to an integrated optical circuit substrate in which are provided the means for separating the radiation from the source towards two first integrated optical guides and means for recombining the radiation guided by two second integrated optical guides, a first monomodal optical fibre forming a measuring arm which is immersed in a first interaction medium exposed to the acoustic wave to be detected, and a second monomodal optical fibre forming a reference arm, the ends of said two fibres being rigidly coupled respectively to one of the first and to one of the second optical fibres, whereby said hydrophone also incorporates an electrically controlled phase modulator acting on one of the integrated optical guides to produce a phase displacement between the guided waves, means for detecting the radiation emerging from the recombination means, and a device for processing detected signals for supplying a control signal to the phase modulator such that the phase displacement between the two arms, independent of the acoustic wave to be detected, is maintained close to a point of maximum sensitivity, the processing device also supplying a measuring signal characteristic of the acoustic wave.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
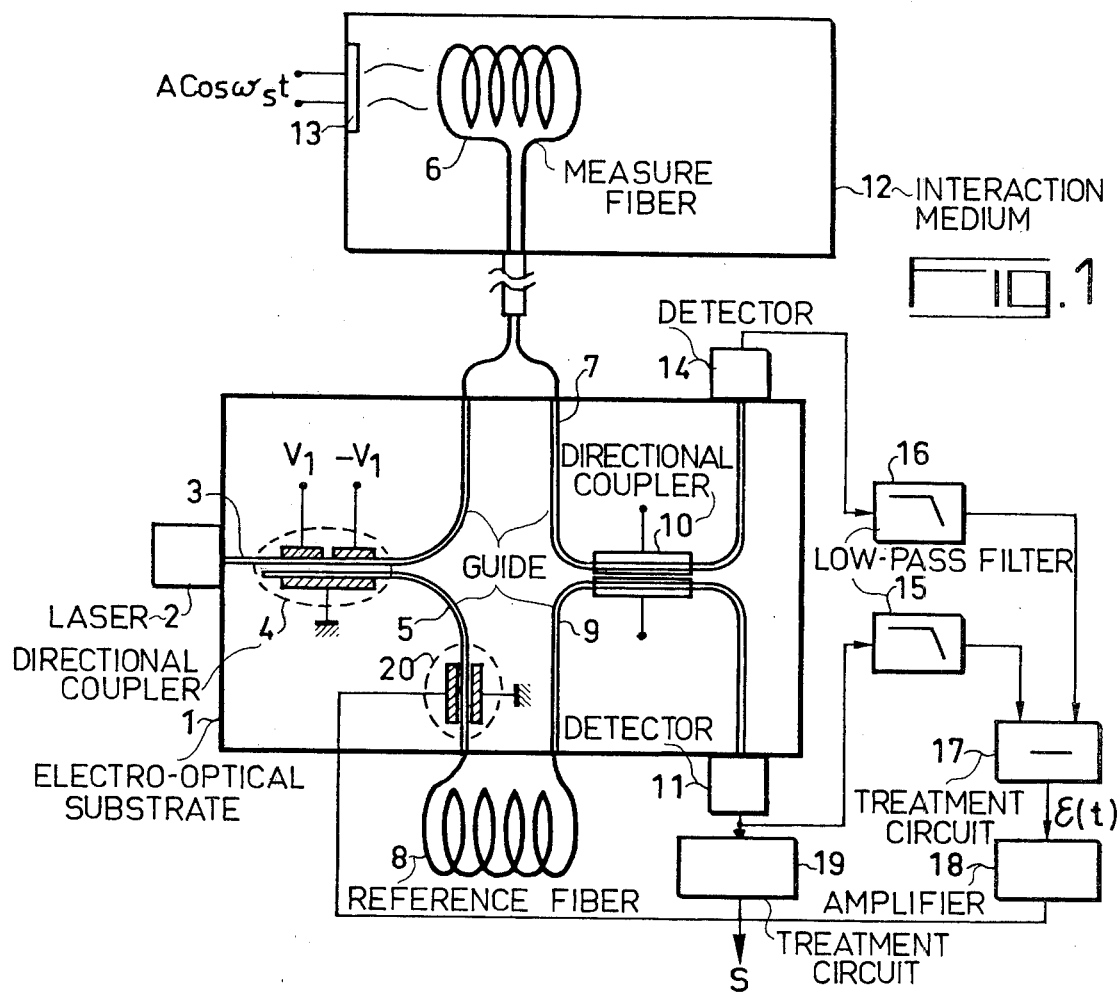
FIG. 1—the diagram of an embodiment of the hydrophone according to the invention.

The hydrophone according to the invention has an interferometer structure and on one of the optical paths of the interferometer has a monomodal optical fibre immersed in the acoustic wave field to be detected, which is assumed to be uniform, of pressure P and frequency $\omega_s$. By the elastooptical effect this acoustic wave field induces a variation in the index $\Delta n$ of the index n of the fibre. This index variation leads to a phase displacement $\Delta\phi$, which is a function of the index variation $\Delta n$, the length l of the immersed fibre and the wavelength $\lambda$ of the optical wave:

$$\Delta\phi(\omega_s) = (2\pi l/\lambda)\Delta n.$$

This index variation $\Delta n$ is equal to $\Delta n_o \sin\omega_s t$ in which $\Delta n_o = \frac{1}{2} n^3 \cdot P_e \cdot P/E$, $P_e$ being the photoelastic constant of the fibre and E the Young modulus of the material forming the fibre (P/E is the stress applied to the fibre by the acoustic wave field). The length l of the immersed monomodal optical fibre must be considerable to enable the phase displacement $\Delta\phi$ to be measured. However, it is also necessary in order to bring about an integration of the effects over the entire length of the fibre that the propagation time in the immersed fibre is not too great compared with the period of the acoustic wave. As an example if the length of the immersed fibre is 600 m, the propagation time of the optical wave in said fibre is 3 $\mu$s. To accept that the pressure field does not vary too rapidly the acoustic wave must not have a frequency higher than $\simeq \frac{2}{3}$kHz (acoustic wave period $\tau_s = 6$ $\mu$s, at least equal to double the propagation time in the fibre).

For a silica monomodal fibre of index n=1.5, of photoelastic constant $P_e = 0.2$ and whose Young modulus is $E = 7 \times 10^{10} N.m^{-2}$, the phase displacement amplitude induced at the acoustic wave frequency for 1 m of interaction length in a pressure field of 1 N m$^{-2}$ is $4.10^{-5}$ rd for an As Ga laser source ($\lambda = 0.9 \times 10^{-6}$m).

The pressures measurable by the optical fibre hydrophone are dependent on the incident optical power, the attenuaton in the fibre at the wave length used, the sensitivity of the photodetector receiving the radiation resulting from interferences between the optical wave propagated in the measuring arm and the optical wave propagated in the reference arm and the length of the fibre exposed to the pressure field. A compromise must be made between an increase in the measured phase displacement resulting from an increase in the length of the fibre and the optical power available on the photodetector, bearing in mind the attenuation introduced by the great fibre length.

To remain between the coherence limits of the source, it is necessary that the optical paths in the measuring arm containing the optical fibres subject to the acoustic pressure field and in the reference arm are equivalent. To obtain this result it is advantageous to use in the reference arm an optical fibre with the same characteristics as the optical fibre of the measuring arm. Bearing in mind the considerable length of the fibre to be used and for the purpose of reduced overall dimensions these fibres can be wound.

For such a device to function under satisfactory conditions it is absolutely necessary that the optical paths in the interferometer are fixed and do not vary when the device is operating. In order that the propagation conditions of the optical wave are as stable as possible it is of particular interest to make the optical connections between the source, the ends of the optical fibres and the detector in a rigid manner, the integrated optical method being particularly suitable for permitting a correct operation of such a device. In addition, such a structure makes it possible to introduce on the optical paths active microstructures electrically controlled so as to significantly improve the operation of the device.

FIG. 1 shows an embodiment of the hydrophone according to the invention. It incorporates an electro-optical substrate 1, for example made from lithium niobate in which are made optical wave guides by diffusion of titanium in order to provide optical connections. The light source is, for example, as As Ga semiconductor laser 2, coupled by the edge to a microguide 3 formed in the substrate which receives the radiation emitted by the source. A directional coupler 4 makes it possible to transfer part of the guided light in guide 3 to a guide 5, whereby said guides 3 and 5 respectively direct the radiation to the measuring arm and to the reference arm. For this purpose a wound monomodal optical fibre 6 has one end coupled to the edge of the substrate to receive the radiation guided in guide 3, whilst its other end is coupled to the edge of the substrate to transmit the emergent radiation to a reception guide 7. In the same way a wound monomodal optical fibre 8 has one end coupled to the edge of the substrate to receive the radiation guided in guide 5, whilst its other end is coupled to the edge of the substrate to transmit the emergent radiation to a reception guide 9.

Optical fibre 6 in the measuring arm is immersed in the acoustooptical interaction medium 12. An electro-acoustic transducer 13 emitting the acoustic wave to be detected is shown in the interaction medium. As stated hereinbefore the acoustic wave creates pressure variations in the medium which lead to variations in the geometrical parameters of the fibre and which by electrooptical effect induce index variations in the said fibre. As a result there is a phase modulation of the guided wave in the fibre at the frequency of the acoustic wave. This effect is small, but due to the great length of the fibre in which the guided wave is propagated the phase variation due to the acoustic wave is measurable. This measurement is performed by interferometry, the reference wave being propagated in the monomodal optical fibre 8. This reference fibre is placed outside the acoustic field and the optical wave which it transmits thus does not undergo variations in its propagation conditions due to the acoustic wave. The maximum sensitivity of such an interferometer is obtained when the relative phase displacement between the two arms is equal to $\pi/2$. This condition could be obtained by creating a fixed phase displacement equal to $\pi/2$ between the two arms, the variable phase displacement at the frequency of the acoustic waves due to the latter acting on the optical fibre being superimposed on the said fixed phase displacement in such a way that the small variations of $\Delta\phi$ are detected in a maximum sensitivity range.

In practice this supplementary phase displacement is very difficult to keep constant in view of the influence of environmental conditions on the propagation conditions, temperature variations, stresses etc., the two fibres being in different media.

The apparatus according to the invention makes it possible to become independent of phase variation between two arms of the interferometer by adding to the variable phase displacement due to the variations in the propagation conditions $\phi_{al}$, another variable phase displacement $\phi_{el}$ created by means of an electrically controlled phase modulator placed on one of the wave guides of the integrated optical circuit, so that the sum $\phi_{al} + \phi_{el}$ is substantially equal to $\pi/2$. The small phase displacements due to the acoustic wave at frequency $\omega_s$ which are superimposed on this almost fixed phase displacement being detected in a range in which the sensitivity is at a maximum.

For this purpose the reception guides 7 and 9 receiving the radiation emerging respectively from the fibre forming the measuring arm 6 and the fibre forming the reference arm 8 are coupled over a previously defined interaction length to form a directional coupler 10. The coupling rate is adjustable by electrical control, two electrodes being provided for this purpose along the two guides. When the coupler is adjusted in such a way that 50% of the incident radiation in an input guide is transmitted in each of the output channels of the coupler, the radiation detected at the outlet of each of these two channels by photodetectors 11 and 14 corresponds to the interferences between the waves transmitted by the measuring fibre and the reference fibre. These two output channels are complementary, so that the sum of the intensities of the detected radiations is equal to the intensity of the incident radiation.

If $\phi(t)$ is the phase displacement between the two arms of the interferometer which is not due to the acoustic wave, and $\Delta\phi(\omega_s) = \beta \sin \omega_s t$ (in which $\beta = 2\pi l \Delta n/\lambda$), the intensity detected by one of the photodetectors is $$I_1(t) = 2I_o[1 + \cos(\beta \sin \omega_s t + \phi(t))]$$

and that detected on the other channel is
TI $I_2(t) = 2I_o 8 \; 1 - \cos(\beta \sin \omega_s t + \phi(t))]$ being the optical radiation intensity circulating in the measuring fibre and in the reference fibre.

The phase variations at the acoustic wave frequency are rapid compared with the other phase variations due to variations in the propagation conditions in the two fibres. Low pass filters 15 and 16, respectively receiving the output signals of detectors 11 and 14, supply signals variable with the variations in the propagation conditions in accordance with d (t), i.e. $I'_1 = 2I_o[1 + \cos \phi(t)]$ and $I'_2 = 2I_o[1 - \cos \phi(t)]$.

Figure 2:
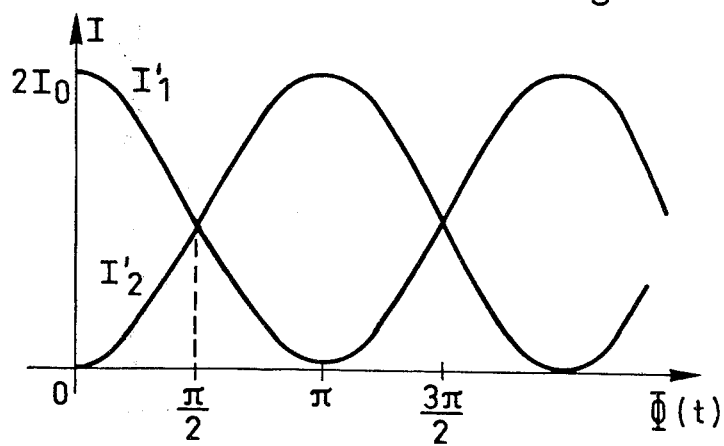
FIG. 2—an explanatory curve of the operation of the hydrophone.

The curves representing these two signals are shown in FIG. 2.

If the photodetectors have the same sensitivity and if the filters have the same characteristics the output signals of filters 15 and 16 are equal when $\phi(t) = \pi/2$. A circuit 17 makes it possible to form the difference between the output signals of the filters and supplies an error signal $\epsilon(t)$, the latter being zero when $I'_1 = I'_2$, i.e. $\phi(t) = \pi/2$. To obtain this operating point for the detection system the signal $\epsilon(t)$ is applied to an amplifier 18 having characteristics such that its output signal applied to the electrodes of an electrically controlled phase modulator 20 placed on one of the wave guides of the integrated optical circuit induces a phase displacement $\phi_{el}$ of the optical wave. This phase displacement added to the random phase displacement $\phi_{al}$ between the two channels (measurement and reference) being such that $\phi(t) = \phi_{al} + \phi_{el}$ is maintained equal to $\pi/2$ at any time.

The measuring signal can then be obtained from the output signal of one of the photodetectors, for example photodetector 11, whose output signal varies like:

$$I_1(t) = 2 I_0[1 + \cos(\beta \sin \omega_s t + \pi/2)]$$

by means of a processing circuit 19 supplying a signal S which is proportional to the phase displacement between the two optical waves due to the acoustic wave.

The invention is not limited to the embodiment of the hydrophone described hereinbefore. In particular to the extent where the source is a semiconductor laser source and the photodetectors of the photodiodes are also semiconductors it is possible to integrate these two components on the actual electrooptical substrate. Moreover, it would also be possible to use a gaseous laser source, for example a helium neon laser, as the optical source. Moreover, the separation function of the optical wave from the source between the measuring arm and the reference arm and the function of recombining these two optical waves emerging from the said arms have been carried out by means of two electrically controlled 3 dB couplers, but other active or passive means can also provide this separation and recombination.

We claim:

1. A monomodal optical fibre hydrophone operated by the elastooptical effect comprising;

a monomodal laser source;

an integrated optical circuit substrate coupled to said laser source said circuit having separation means for separating the radiation from said source;

fiirst integrated optical guides for receiving said separated radiation;

recombining means for recombining the radiation guided by a pair of second integrated optical guides;

first monomodal optical fibre forming a measuring arm which is immersed in a first interaction medium exposed to the acoustic wave to be detected;

second monomodal optical fibre forming a reference arm with the ends of said two fibres being rigidly coupled respectively to one of said first and one of said second optical guides;

an electrically controlled phase modulator acting on one of said first integrated optical guides to produce a phase displacement between said guided radiation;

means for detecting the radiation emerging from said recombination means, and processing means for processing said detected radiation and supplying a control signal to said phase modulator whereby the phase displacement between said two arms is maintained substantially at a point of maximum sensitivity independent of the acoustic wave which is detected and said processing means further supplying a measuring signal characteristic of said acoustic wave.

2. A hydrophone according to claim 6, wherein said radiation recombination means includes two complementary output channels, said detection means includes two photodetectors respectively coupled to each of the output channels, said processing device includes low pass filtering means for the signal from the photodetectors, said circuit forms the difference between the signals emerging from the filtering means, and said filtering means, and said control circuit supplies the control signal to the phase modulator.

3. A hydrophone according to claim 6 wherein said radiation separation means and said radiation recombination means are electrically adjustable directional couplers with a supply means being provided for adjusting the coupling rate of said couplers.

4. A hydrophone according to claim 1, wherein said source is a semiconductor laser source having an exit pupil, said exit pupil being rigidly edge coupled to the integrated optical circuit through the agency of an input optical waveguide belonging to said separation means.

5. A hydrophone according to claim 1, wherein the detection means are formed by semiconductor photodiodes rigidly edge coupled to the integrated optical circuit, through the agency of the output waveguide of said recombination means.

* * * * *